United States Patent [19]
Aubert et al.

[11] 4,129,481
[45] Dec. 12, 1978

[54] URANIUM ISOTOPIC ENRICHMENT

[75] Inventors: Jacques Aubert; Maurice Carlés; Roger Neige, all of Pierrelatte, France

[73] Assignee: Commissariat A l'Energie Atomique, Paris, France

[21] Appl. No.: 767,984

[22] Filed: Feb. 11, 1977

[30] Foreign Application Priority Data

Feb. 13, 1976 [FR] France .............................. 76 03986

[51] Int. Cl.² .............................................. C25C 1/22
[52] U.S. Cl. .................................... 204/1.5; 204/257; 204/261; 204/263; 423/8
[58] Field of Search ................ 204/1.5, 257, 261, 263; 423/8, 9, 10

[56] References Cited

U.S. PATENT DOCUMENTS

| 2,787,587 | 4/1957 | Woodard | 204/1.5 |
| 3,616,276 | 10/1971 | Schneider | 204/1.5 |

FOREIGN PATENT DOCUMENTS

| 1403198 | 5/1965 | France | 204/1.5 |
| 1465032 | 11/1966 | France | 204/1.5 |
| 2065652 | 6/1971 | France | 204/1.5 |

Primary Examiner—Leland A. Sebastian
Attorney, Agent, or Firm—Ostrolenk, Faber, Gerb & Soffen

[57] ABSTRACT

A chemical process of isotopic enrichment of uranium makes use of isotopic exchange between an aqueous phase loaded with uranium III and another phase charged with uranium IV. Reduction and oxidation of uranium in aqueous phase are carried out using the same electrolyzer. Reduction may be by zinc amalgam which is later electrolytically reduced.

12 Claims, 5 Drawing Figures

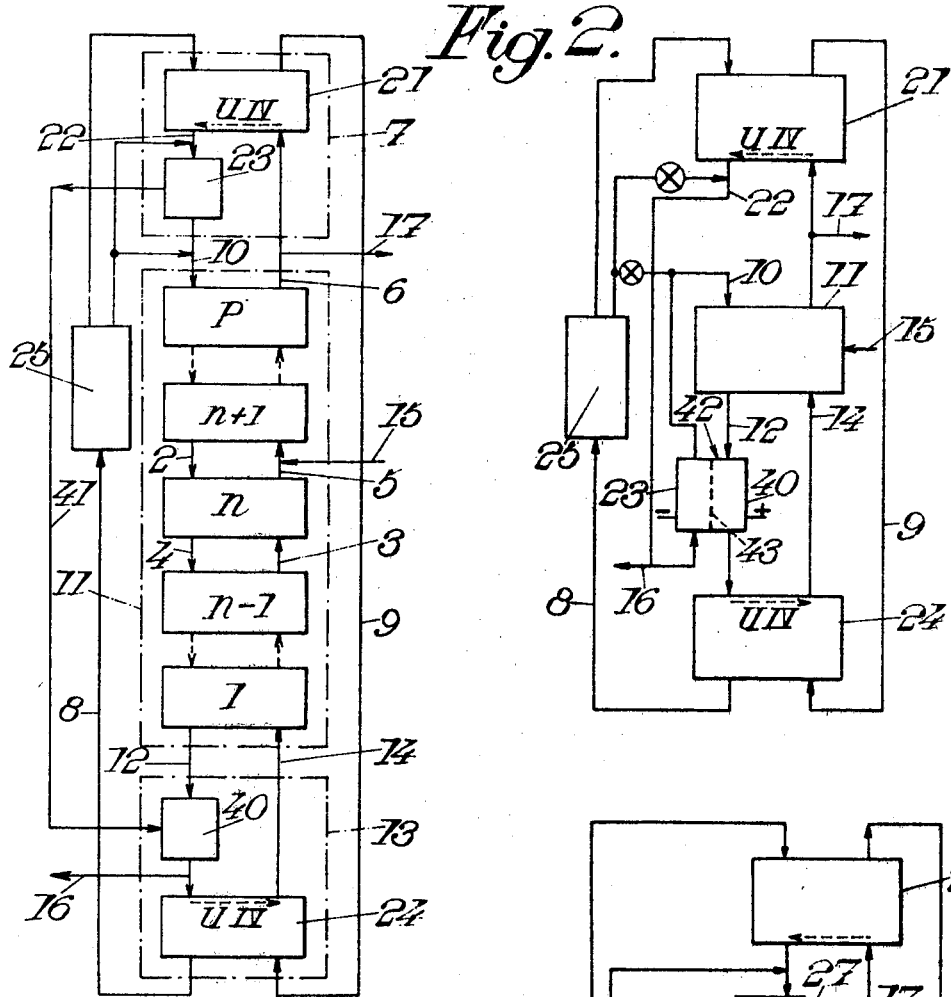
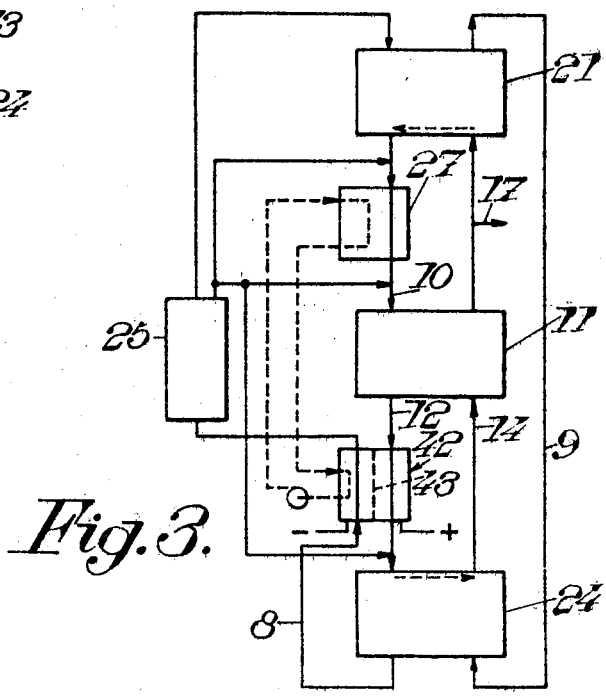

URANIUM ISOTOPIC ENRICHMENT

BACKGROUND OF THE DISCLOSURE AND SUMMARY OF THE INVENTION

The present invention relates to isotopic enrichment of uranium with one of its isotopes by chemical exchanges in cascade between two phases one of which is aqueous and uranium being present with different valences in the two phases.

Chemical methods of enriching uranium are known. For instance, U.K. Patent Specification No. 1,120,208 and French Patent Specification No. 1,600,437 disclose method in which the second phase is a ion exchange resin. Isotopic exchange is between tetravalent uranium IV and hexavalent uranium UVI which is present as uranyl $UO_2^{++}$.

According to a more efficient method, disclosed in French Patent Specification No. 2,282,928, exchange is between UIII and UIV. It is essential that the UIII containing phase be kept out of contact with electrically conductive walls and be kept free of oxidizing impurities.

It is also well known that a sufficient degree of enrichment is obtained only if a number of sub-cascades are connected for forming an enrichment cascade. If enrichment is by the chemical route, each sub-cascade comprises several contacting units in series for exchange between uranium at a first valence (+ 3 for instance) and the other phase containing uranium at the second valence ('4 for instance), an oxidizing reflow in which 235 U-depleted uranium is oxidized from the lower valence to the higher valence, and a reducing reflow in which 235 U-enriched uranium is reduced from the higher valence to the lower valence.

Two reducing approaches have been tried, namely direct electrolysis of an aqueous acid solution of a uranium salt and chemical reduction by zinc amalgam which is later electrolytically regenerated.

On the other hand, oxidation is generally by action of an oxidant gas obtained during electrolysis on an aqueous phase containing uranium at the lower valence.

One of the steps, the reducing step, consumes large amounts of power while oxidation releases heat which cannot be recovered. French Specification No. 1,600,437, which is essentially directed to chemical exchange between an aqueous phase and a second phase consisting of a fixed bed of ion exchange resin, makes a passing reference to the possibility of circulating phases containing the element to be processed through the anode compartment of an electrolytic cell (for oxidation) and the cathode compartment (for reduction). However, no illustration of that approach is given and the only example which is described consists of UIV–UVI exchange on a fixed bed of resin, reduction of UVI into UIV being by electrolysis of $UO_2Cl_2$ and oxidation by $O_2$ collected in the anode compartment of the electrolyser. The inventors failed to appreciate that the use of a conventional electrolyser, even with a diaphragm, for reducing UIV to UIII would not be operative and the method cannot be considered as of general use.

In addition, reduction of the element to be processed should be complete and the prior electrolysis methods are not adapted to provide acceptable Faraday efficients under such conditions.

It is an object of the present invention to provide a chemical enrichment process which makes use of exchange between UIII and UIV and of an oxidation-reduction electrolytic step without gas generation and which makes it possible to decrease the energy consumption substantially.

It is another object of the invention to provide a uranium enrichment method by the chemical exchange route which uses reduction of uranium by zinc amalgam and a combined oxidation-reduction step for regenerating the amalgam and oxidizing uranium, again without gas generation.

According to a first aspect of the invention, there is provided a process for effecting isotopic exchange between a compound of uranium at a first valence and a compound of uranium at a second valence unreactive with the first compound to produce enrichment of the lighter uranium isotope in the compound of uranium at the higher of the first and second valences, said valences being III and IV, which comprises repeating a number of times a cycle which comprises:

contacting an aqueous acid phase loaded with the compound of uranium at the first valence with a different phase loaded with the compound of uranium at the second valence, under conditions such that there is substantially no net transfer of uranium, in either valence state, from one phase to the other;

extracting uranium at said second valence from said other phase, after said contact, by said aqueous phase which has previously been depleted of its uranium contents;

subjecting the uranium contents in said aqueous phase, after said extraction, to a valence change from said second valence to said first valence by a process which involves electrolysis, before any new contact with said other phase;

changing the valence of the uranium contained in said aqueous phase, after said contact, from said first valence to said second valence during that same electrolysis which occurs during the change of valence from said second to the first valence;

and transferring uranium at said second valence into said other phase which has previously been depleted of its uranium contents.

According to a first embodiment, tetravalent uranium is reduced to trivalent uranium electrolytically. According to another embodiment, UIV in an aqueous solution is reduced by zinc contained in zinc amalgam and the amalgam is electrolytically regenerated.

According to another aspect of the invention, there is provided a process for effecting isotopic exchange between a compound of uranium at a first valence and a compound of uranium at a second valence unreactive with the first compound to produce enrichment of the lighter uranium isotope in the compound of uranium at the higher of the first and second valences, which comprises repeating a number of times a cycle which comprises:

contacting an aqueous acid phase loaded with the compound of uranium at the first valence with a different phase loaded with the compound of uranium at the second valence, under conditions such that there is substantially no net transfer of uranium, in either valence state, from one phase to the other;

extracting uranium at said second valence from said other phase, after said contact, by said aqueous phase which has previously been depleted of its uranium contents;

subjecting the uranium contents in said aqueous phase, after said extraction, to a valence change from said second valence to said first valence;

changing the valence of the uranium contained in said aqueous phase, after said contact from said first valence to said second valence;

and transferring uranium at said second valence into said other phase which has previously been depleted of its uranium contents, wherein uranium is chemically reduced from the higher of said valences to the lower of said valences by contacting it with zinc amalgam having a zinc content of from 1.1% to 1.8% and said zinc amalgam is later regenerated by circulating it as a cathode in an electrolyser, while said uranium is oxidized from the lower one of said first and second valences to the higher of said valences by circulating the aqueous phase loaded with the uranium to be oxidized through the cathode compartment of the same electrolyser.

Oxidation of uranium may be carried out by electrolysis with an anode of lead, lead amalgam, graphite (if there is no free oxygen), mercury or tantalum. Lead is generally of advantage. Reduction is then carried out in the cathode compartment of the electrolyser which is fed with amalgam and with an aqueous solution of a zinc salt. The amalgam typically contains from 1.1 per cent to 1.8 per cent of zinc by weight at the output. The aqueous solution is preferably a hydrochloric solution having 4-5N of $ZnCl_2$ at the input and 3-4N at the output. Then, there is a sufficient amount of $ZnCl_2$ at the output for the Faraday efficiency $\eta_F$ of the electrolysis to be substantially higher than in a process where complete reduction takes place.

The invention will be better understood from the following description of preferred embodiments given by way of examples. The description refers to the accompanying drawings.

SHORT DESCRIPTION OF THE DRAWINGS

FIG. 1 is a simplified representation of a chemical exchange sub-cascade according to the prior art;

FIG. 2 represents schematically a sub-cascade according to an embodiment of the invention, wherein reduction of uranium is carried out by direct electrolysis of an aqueous phase;

FIG. 3 represents schematically a sub-cascade according to another embodiment of the invention, wherein reduction of uranium is carried out by biphasic exchange on zinc amalgam modification wherein the zinc amalgam is regenerated by electrolysis;

DESCRIPTION OF PREFERRED EMBODIMENTS

Figure 4:
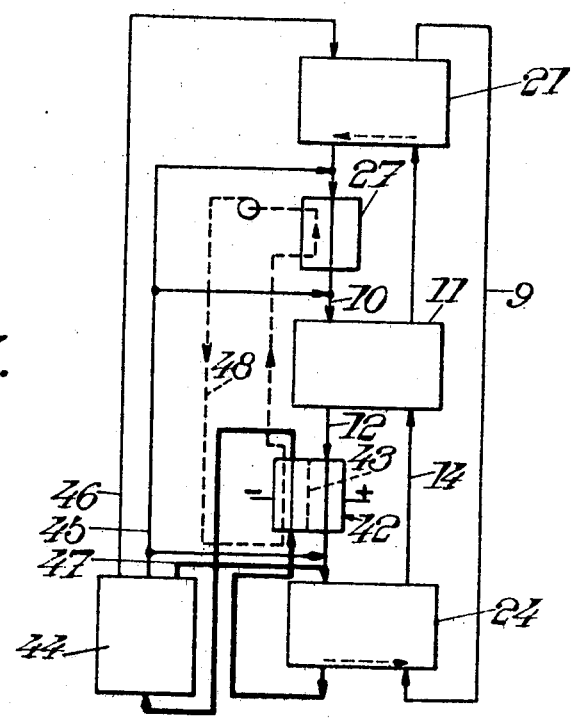
FIG. 4 is a modificatin of the sub-cascade of FIG. 3.

Referring to FIG. 1, it will be assumed for clarity that the sub-cascade is used for isotopic enrichment of natural uranium with 235 isotope by exchange between an aqueous phase, for example a hydrochloric phase, containing uranium at valence + 3, and an organic phase containing uranium at valence IV. Such a sub-cascade is described in French Specification No. 2,282,928 to which reference may be made. The aqueous phase flows through a loop 8 and the organic phase through a loop 9. An isotopic exchange battery 11 comprises p identical stages each having a contactor, for instance a mixer-settler. The stages are indicated by the references 1, ..., $n-1, n, n + 1, \ldots p$. Contactor n will be considered. The aqueous phase containing uranium at valence +3 enters at 2, coming from contactor n+1, and is mixed with the organic phase containing uranium at valence IV which enters at 3 from contactor $n-1$. After contact and separation, the aqueous phase and organic phase leave at 4 and 5, respectively. The aqueous phase containing uranium at valence + 3 becomes progressively depleted of isotope 235 until it reaches contactor 1 while the organic phase containing uranium at valence IV becomes progressively enriched with isotope 235 until it reaches contactor p. If B is the coefficient of enrichment at each stage or contactor and if Rn is the ratio of isotopic richness (isotope 235/isotope 238) of uranium, which may be supposed to be equal at the inlets, the 235 U richness of the organic phase is Rn.B at the outlet of the nth contactor.

The organic phase leaving the isotopic exchange battery 11 at 6 enters the extractor 21 of a "rich reflow" or "reducing reflow" 7 wherein the 235 U enriched uranium at valence IV is extracted by the uranium depleted aqueous phase arriving from 8, and is then reduced to uranium of valence +3. The UIII loaded aqueous phase is reintroduced into the isotopic exchange battery 11 at 10.

Similarly, the aqueous phase leaving at 12 enters a "depleted" or "oxidizing" reflux 13. The 235 U depleted uranium at valence + 3 is oxidized to valence + 4 by chlorine flowing from electrolyser 23 and extracted by the previously depleted organic phase from 9 in an extractor 24. The organic phase is reintroduced into the isotopic exchange battery 11 at 14.

The calculations carried out on an enrichment subcascade show that it is advantageous to adjust the "ascending" flow rates at each stage from 1 to p, and the "descending" flow rates in such a manner as to prevent isotopic remixing, that is to say in a manner to bring the uranium at 3 to the same isotopic richness as the uranium arriving at 2. This condition is not economically but it is advantageous to come as close as possible to this ideal profile by achieving partial reflow between a plurality of "square" sub-cascades. In FIG. 1, uranium is introduced at a very low rate of flow at 15 while 235 U-enriched uranium and 235 U-depleted uranium are withdrawn at correspondingly low rates of flow at 17 and 16, respectively.

The organic phase may be a solvent such as triisobutylphosphate or TIBP and the aqueous phase a hydrochloric solution. The organic phase contains $UCl_4$ and the aqueous phase $UCl_3$.

The 235 U-enriched organic phase leaving the contactors 11 gives up its uranium to the aqueous phase (water with a low hydrochloric acid content) in extractor 21. The $UCl_4$ loaded aqueous phase is acidified at 22. The uranium of valence + 4 is then reduced to uranium of valence + 3 in an electrolyser 23 before entering the battery 11.

After isotopic exchange, uranium contained in the 235 U-depleted aqueous phase is oxidized at 40 before the aqueous phase reaches extractor 24 wherein uranium IV is entirely taken by the "ascendin" stream of organic phase arriving from the first extractor 21. The aqueous phase, from which uranium has been extracted in the second extractor 24, is de-acidified at 25 and recycled to the first extractor 21.

As indicated above, reduction gives way to considerable energy consumption in the device of FIG. 1. The power consumption is substantially decreased in the apparatus of FIG. 2. For more clarity, those components in FIG. 2 which correspond to those of FIG. 1 are referred to by the same reference numerals. They will not be described again.

Referring to FIG. 2, he reducing unit 23 and the oxidizing unit 40 consist of a same electrolyser 42 having a diaphragm 43.

The $U^{+4}$ bearing aqueous acid phase which flows out of extractor 21 is directed to the cathode compartment of electrolyser 42. The aqueous phase containing uranium reduced to trivalent is withdrawn from the electrolyser. Reduction is continuous.

Simultaneously, the $U^{+3}$ bearing aqueous acid phase from battery 11 flows through the anode compartment of electrolyser 42 where trivalent uranium is oxidized to tetravalent.

Reduction and oxidation are performed according to the formulae:
at the cathode:

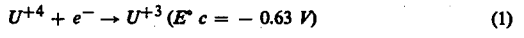  (1)

at the anode:

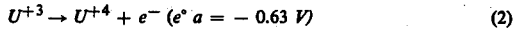  (2)

Since E° $a$ and e° $c$ (the oxidoreduction potentials of equations (1) and (2)) are equal, then the theoretical minimun electrolysing voltage, at zero current, is also zero.

Obviouly, some current should flow between the cathode and the anode for the reaction to proceed and consequently a voltage difference should be maintained, whichh will increase with the current. However, the advantages of the approach is apparent from a comparison of equations (1) and (2) with the corresponding equations for reduction of UCl$_4$ with chlorine release at the anode, which equations are at the cathode:

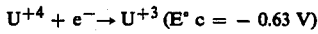

at the anode:
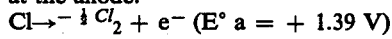

Hence the minimum electrolytic potential E* is: E° = E° a − E° c = 2.02 V.

Oxidoreduction electrolysis therefore provides an economy in potential of about 2 volts compared with reduction electrolysis with release of chlorine. Similar results would be obtained for any electrolysis with production of a gas (such as O$_2$ for UO$_2$Cl$_2$ reduction) at the anode.

Oxidation of uranium is carried out by discharge of $U^{+3}$ ions when they contact the anode. This anode must consequently fulfil the following conditions: it must have an oxidoreduction potential greater than that of the $U^{+3}/U^{+4}$ system and it must not allow oxidation of $U^{+3}$ to take place when no current flows.

Among the various materials which fulfill these criteria, lead, lead amalgam, graphite, mercury and tantalum are acceptable. The best results have been obtained with lead.

The cathode should similarly be made of a material which has an oxidation-reduction potential such that it doe not result in oxidation of uranium from trivalent to tetravalent. The only practical material for the cathode appears to be mercury.

Phase mixing across the diaphragm should be avoided, since the isotopic compositions of the uranium present in the two phases are different. The following methods have been used and provide satisfactory results:

an impervious diaphragm of ion exchange material is used. As an example, a cation exchange diaphragm of the type sold under the trade name "NAFION 425" by DU PONT DE NEMOURS, which is available as large size plates and can be carried by a reinforcing frame has been used;

a composite diaphragm of porous material may also be used, with a scavenging flow between the elementary diaphragms. Tests have been made using a composite assembly consisting of three parallel walls of porous glass, which limit two flat chambers between the cathode and anode compartments. Each chamber is swept by a strongly acid aqueous solution which removes any uranium filtering from the adjacent compartment. Uranium is later recovered with the same isotopic composition.

Different electrolysers may be used. However, any surface which is in contact with uranium after reduction thereof to trivalent should be electrically insulating and should not release oxidizing impurities into the uranium solution. Preferably, a vertical electrolyser of the type described in U.S. Patent Application Ser. No. 763,633, corresponding to French Application No. 76 03017 is used. That electrolyser has a cathode essentially consisting of a large number of continuous substantially cylindrical streams of mercury which flow vertically from apertures in the bottom wall of one or more horizontal channels. Satisfactory results are also obtained with a horizontal electrolyser of the type described in U.S. Patent Application Ser. No. 763,614, corresponding to French Application No. 76 03015.

A number of experiments carried out with a vertical electrolyser have shown satisfactory using the following values:

Aqueous phase admitted to the anode compartment

HCl content: at least 3N for decreasing the ohmic losses $U^{+3}$ as UCl$_3$: any content within the range appropriate for exchange with a UIV loaded organic phase will generally be acceptable; a 1M concentration will typically be used.

Aqueous phase admitted to the cathode compartment

HCl content: 0.7N to 2N (typically about 1N); below 0.7N, there is sludge formation and beyond 2N the Faraday yield decreases abruptly.
UCl$_4$ content: generally about 1M/1
cathode current density: 0.25 A/cm$^2$ or more.

Reduction need not be quantitative, since the Faraday yield for reducing the last traces of UIV to UIII would be low. Any residual amount of UIV may be removed by a washing solution and recovered prior to the next contact with the organic phase.

Referring to FIG. 3 (where elements corresponding to those of FIG. 2 are designated by like reference numerals), there is illustrated an embodiment where uranium is reduced to trivalent by zinc amalgam. Reduction is carried out by contact between two phases in a contacting device located on the path of the aqueous acid phase between extractor 21 and battery 11. Any conventional contacting device is acceptable if the internal surface is of an appropriate nature, i.e. electrically insulating and not prone to provide oxidizing impurities to the aqueous phase. The main advantage of that approach is that the Faraday yield may be better for amalgam regeneration than for direct electrolytic uranium reduction.

A typical contactor consists of a column loaded with glass balls some millimeters in diameter: the zinc amalgam flows downwardly across the bed of balls while the aqueous phase is flowed upwardly. Amalgam is collected at the bottom of the contactor based on the difference in specific density. A contactor some decimeters high is sufficient for almost complete reduction. The percentage of zinc at the contactor input is generally from 1.1% to 1.5% since amalgam containing more than 1.8% by weight of zinc is pasty. Zinc reduces $U^{+4}$ to $U^{+3}$ and the aqueous phse becomes loaded with $Zn^{++}$. The aqueous phase is recycled, after isotopic exchange, to the anodic compartment of electrolyser 42, whose cathode compartment receives the zinc depleted amalgam and the uranium depleted aqueous phase from 24.

The following data are illustrative of a workable embodiment of the electrolytic cell 42:

| | |
|---|---|
| Anode and cathode surface area | 80 cm$^2$ |
| Distance between anode and cathode | 43 mm |
| Volume of cathode and anode compartments | 800 cm$^2$ |
| Diaphragm: porous glass | |
| Current density | 25 A/dm$^2$ |
| Cathode aqueous solution (catholyte) at input: | MgCl$_2$ 3 N, HCl 3 N, ZnCl$_2$ 4 N, UCl$_3$ 1M/l |
| Anode solution (anolyte), at input: | HCl 3N, ZnCl$_2$ 1N |
| Temperature: 20-30° C | |
| Cathode: film of mercury flowing on a vertical cupronickel cathode. | |
| Anode: solid part of lead, lead amalgam, graphite, mercury or tantalum. | |

At the output of the cathode compartment, the zinc amalgam is separated from the aqueous solution in a separator (not shown) which may be conventional; the specific weights are sufficiently different for separation to be easy.

The following experimental results have been obtained with different anodes:

| Nature of vertical anode | Current density (A/cm$^2$) | Voltage (V) | Faraday yield (zinc) | Remarks |
|---|---|---|---|---|
| Lead | 0.125 | 1.85 | 0.93 | The anode must be continuously agitated in order to obtain stability of the electrolytic current |
| | 0.15 | 2.2 | 0.82 | |
| | 0.20 | 2.7 | 0.88 | |
| | 0.24 | 3.2 | 0.87 | |
| | 0.25 | 3.4 | 0.97 | |
| | 0.25 | 3.4 | 0.90 | |
| | 0.31 | 3.95 | 0.87 | |
| Lead amalgam | 0.125 | 2.2 | 0.98 | " |
| | 0.25 | 4.3 | 0.72 | |
| Graphite | 0.125 | 4.4 | 1 | Current voltage and density are stable |
| | 0.25 | 6.1 | 0.88 | |
| | 0.34 | 6.6 | 0.87 | |
| Cupronickel covered with a mercury film (anode identical to the cathode) | 0.10 | 1.65 | 0.96 | Voltage and density very unstable, slight deposit of magma in the cell |
| | 0.25 | 3.8 | 0.88 | |
| | 0.31 | 7.8 | 1 | |
| Tantalum | | | | Very high voltage and low current density |

It was found that the best results are obtained with lead. The Faraday yields calculated from the amount of zinc deposited is about 0.9. Theoretical voltages are less by about 2 volts than those used in electrolysis with release of chlorine. The following figures are in fact obtained with the same cell as above, operating with the same catholyte and an anolyte consisting of 5N HCl:

4.6 – 5.3 V at 0.125 A/cm$^2$
5.9 – 6.6 V at 0.25 A/cm$^2$
7.15 –8.1 V at 0.38 A/cm$^2$.

Figure 5:
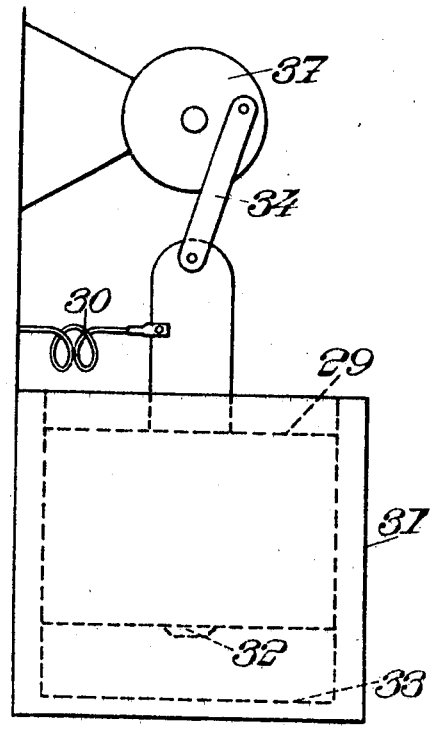
FIG. 5 is a simplified illustration of an embodiment of the anode of the electrolyser of FIG. 2.

Stability of the electrolytic current is obtained by continuous agitation of the lead anode. An agitating device is represented in FIG. 5 and will be described later.

Referring now to FIG. 4, there is shown a modification of FIG. 3 which permits to further improve the Faraday yield with a minimum of additional hardware.

Before the embodiment of FIG. 4 is described, it may be useful to indicate that one of the factors which limit the Faraday yield of the electrolyser of FIG. 3 is the need to reduce the zinc chloride introduced into the cathode compartment substantially completely. That limitation is removed in the embodiment of FIG. 4 which includes an additional loop in which there is a flow of ZnCl$_2$. That makes it possible to accept a ZnCl$_2$ content of from about 3 N to about 4 N at the outlet of the cathode compartment of electrolyser 42.

Rather than a single stage deacidifcation unit, as in the embodiment of FIG. 3, there is provided a distillation unit 44 with two stages. The distillation unit 44 receives the uranium depleted aqueous solution from the cathode compartment of electrolyser 42. That aqueous solution has:

a hydrochloric acid content which is selected for satisfactory transfer of UIV to the organic phase (typically about 3), a content of alkali metal halogenide (typically LiCl) such that the normality of salting out ions Cl$^-$ in the aqueous phase be sufficient for complete transfer of uranium into the organic phase at 24 (for instance 3N), a ZnCl$_2$ content (whose salting out action is generally negligible) which may typically be of from 4 to 5N.

The distillation unit may be conventional. When the temperature increases, the following compounds are successively collected:

at 44, almost anhydrous hydrochloric acid which is used for adjusting the acidity of the aqueous phase in contactor 27 (the acidity beingg low enough for not reacting with the amalgam, but high enough for maintaining $U^{+3}$ in solution, typically about 2.5N), then in battery 11 (typically about 4N), last in extractor 24; valves similar to those illustrated in FIG. 3 may be provided for adjusting the rates of flow;

at 46, slightly acid water which is directed to extractor 21;

at 47, a concentrated aqueous LiCl and ZnCl$_2$ solution which is recycled to the aqueous phase immediately upstream of extractor 24.

As a consequence, the cathode compartment of the electrolyser receives:

mercury and zinc amalgam, which flows along a loop 48 (in dash line on FIG. 4) and has a percentage of zinc which increases in the electrolyser 43, while it decreases in the reduction unit 27;

a aqueous acid phase, containing from 4 to 5N of ZnCl$_2$ part of which is chemically reduced and releases zinc which is taken by the amalgam. As an example, the zinc content of the amalgam may be 1.1% by weight at the input and 1.5% at the output while the $ZnCl_2$ content of the aqueous phase correlatively decreases by 1N.

It appears that the $ZnCl_2$ content of the aqueous phase at the output of the cathodic compartment is sufficient for the Faraday yield to be satisfactory without the electrolyser. That result only involves the use of a supplemental loop, indicated in strong line on FIG. 4.

As a counterpart of that advantage, the minimum theoretical electrolysis voltage is not zero as in FIG. 2 since:

$E° a = 0.63$ V (oxidation of uranium from trivalent to tetravalent $E° c = 0.67$ V (reduction of $Zn^{2+}$).

As a consequence, $E° = 0.13$ V, which is however much lower than that found in the embodiment of FIG. 1.

The anode of the electrolyser may be as indicated on FIG. 5. A solid lead anode 29 dips into an electrolyser compartment 31 and is provided with a lower lug 32 for abutting a support 33. The higher portion of anode 29 is provided with an electric supply line 30 and is connected by a rod 34 to a crank actuatable by an electric motor 37. When the electric motor 37 is energised, it reciprocates anode 29. That movement disturbs the limit layer and provides a satisfactory renewal of the $U^{+3}$ ions which contact the anode 29.

A number of modifications may be made to the devices which were described above. As an example, they can be used in an apparatus where the two phases are an aqueous phase and a solid phase, on the condition that reduction and oxidation are carried out in aqueous phase. The $Cl^-$ ions may be substituted with bromine, iodine or fluorine ions if appropriate materials are used.

We claim:

1. A process for effecting isotopic exchange between a compound of uranium at a first valence and a compound of uranium at a second valence unreactive with the first compound to produce enrichment of the lighter uranium isotope in the compound of uranium at the higher of the first and second valences, said valences being III and IV, which comprises repeating a number of times a cycle which comprises:

contacting an aqueous acid phase loaded with the compound of uranium at the first valence with a different phase loaded with the compound of uranium at the second valence, under conditions such that there is substantially no net transfer of uranium, in either valence state, from one phase to the other;

extracting uranium at said second valence from said other phase, after said contact, by said aqueous phase which has previously been depleted of its uranium contents;

subjecting the uranium contents in said aqueous phase, after said extraction to a valence change from said second valence to said first valence by a process which involves electrolysis, before any new contact with said other phase;

changing the valence of the uranium contained in said aqueous phase, after said contact, from said first valence to said second valence during that same electrolysis which occurs during the change of valence from said second to the first valence;

and transferring uranium at said second valence into said other phase which has previously been depleted of its uranium contents.

2. A process according to claim 1, wherein uranium is chemically reduced from the higher one of said valences to the lower one of said valences by flowing the aqueous phase loaded with uranium at the higher valence through the cathode compartment of an electrolyser, while uranium is oxidized from the lower one of said first and second valences to the higher one of said valences by circulating the aqueous phase loaded with uranium at the lower valence through the anode compartment of the same electrolyser.

3. A process according to claim 1, wherein uranium is chemically reduced from the higher of said valences to the lower of said valences by contacting it with zinc amalgam having a zinc content of from 1.1% to 1.8% and said zinc amalgam is later regenerated by circulating it as a cathode in an electrolyser, while said uranium is oxidized from the lower one of said first and second valences to the higher of said valences by circulating it through the anode compartment of the same electrolyser.

4. A process according to claim 3, wherein the reduction process involves directing to said cathode compartment both zinc amalgam containing at most 1.5% of zinc by weight as a cathode and an at least 3N HCl aqueous solution containing $ZnCl_2$.

5. A process for effecting isotopic exchange between a compound of uranium at a first valence and a compound of uranium at a second valence unreactive with the first compound to produce enrichment of the lighter uranium isotope in the compound of uranium at the higher of the first and second valences, which comprises repeating a number of times a cycle which comprises:

a. contacting an aqueous acid phase loaded with the compound of uranium at the first valence with a different phase loaded with the compound of uranium at the second valence, under conditions such that there is substantially no net transfer of uranium, in either valence state, from one phase to the other;

b. extracting uranium at said second valence from said other phase, after said contact, by said aqueous phase which has previously been depleted of its uranium contents;

c. subjecting the uranium contents in said aqueous phase, after said extraction, to a valence change from said second valence to said first valence;

d. changing the valence of the uranium contained in said aqueous phase, after said contact from said first valence to said second valence;

e. and transferring uranium at said second valence into said other phase which has previously been depleted of its uranium contents, wherein uranium is chemically reduced from the higher of said valences to the lower of said valences by contacting it with zinc amalgam having a zinc weight content of from 1.1% to 1.8% and said zinc amalgam is later regenerated by circulating it as a cathode in an electrolyser, while said uranium is oxidized from the lower one of said first and second valences to the higher of said valences by circulating the aqueous phase loaded with the uranium to be oxidized through the cathode compartment of the same electrolyser.

6. A process according to claim 5, wherein the reduction process involves directing to said cathode compartment both zinc amalgam containing at most 1.5% of zinc by weight as a cathode and an at least 3N HCl aqueous solution containing $ZnCl_2$.

7. A process according to claim 6, wherein the aqueous solution directed to the cathode compartment is 4N–5N $ZnCl_2$ and the electrolysis is carried out under such conditions that the aqueous solution is 3N–4N $ZnCl_2$ at the output of the cathode compartment.

8. A process according to claim 7, wherein the phase flowing out of the cathode compartment is subjected to distillation for separating it into slightly acid water which is recycled at step (b), substantially anhydrous hydrochloric acid which is used for adjusting the acidity of the aqueous phase and a concentrated aqueous solution of $ZnCl_2$ which is mixed with the aqueous phase immediately prior to step (e).

9. A process according to claim 8, wherein said aqueus phase is loaded with lithium chloride which is recycled along with $ZnCl_2$.

10. An apparatus for effecting isotopic exchange between a compound of uranium III and a compound of uranium IV unreactive with the first compound to produce enrichment of the lighter uranium isotope in the compound of uranium IV, which comprises;
an exchange battery having contactor means,
means for circulating in said battery an aqueous acid phase loaded with the compound of uranium III and for circulating, in countercurrent with said aqueous phase and in contact therewith, a different phase loaded with the compound of uranium IV, said battery being devoid of metal surface in contact with the aqueous phase,
means connected to receive said different phase flowing out the battery and for depleting said different phase in uranium IV,
oxidizing means connected to receive the aqueous phase flowing out of the battery and for oxidizing uranium III in said aqueous phase,
means connected to receive the aqueous phase from said oxidizing means and for depleting it in uranium IV,
means for transferring the uraium IV extracted from said aqueous phase into said different phase,
means for transferring the uranium IV extracted from said different phase into said aqueous phase,
and reducing means connected to receive the aqueous phase into which the uranium IV has been transferred and for reducing uranium IV in said aqueous phase to uranium III,
said oxidizing means and reducing means including a same electrolyser.

11. Apparatus according to claim 10, wherein said electrolyser has a casing a diaphragm separating said casing into a cathode compartment and an anode compartment, means for directing the aqueous phase flowing out of the battery to the anode compartment and means for directing the uranium IV containing aqueous phase to the cathode compartment, and means for circulating a flow of mercury consituting a cathode through said cathode compartment.

12. Apparatus according to claim 10, wherein said electrolyser comprises a casing diaphragm means separating said casing into a cathode compartment and an anode compartment, means for directing said aqueous phase flowing out of the battery to said anode compartment, means for directing an aqueous acid solution containing a salt of an hydracid whose cation is zinc to the cathode compartment and means for circulating the amalgam as a cathode through said cathode compartment.

* * * * *